United States Patent
Schubert

(12)
(10) Patent No.: US 6,403,674 B1
(45) Date of Patent: Jun. 11, 2002

(54) SOLVENT-FREE METHOD FOR SYNTHESIZING SUPERABSORBENT POLYMERS

(75) Inventor: Mark A. Schubert, Brunswick, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 68 days.

(21) Appl. No.: 09/716,193

(22) Filed: Nov. 17, 2000

(51) Int. Cl.[7] .............................. C08J 3/28; C08F 20/06; C08F 220/06
(52) U.S. Cl. .................. 522/167; 522/168; 522/173; 522/175; 522/178; 522/181; 522/182; 522/188; 526/263; 526/270; 526/286; 526/302; 526/304; 526/328; 526/333
(58) Field of Search ................. 522/167, 168, 522/173, 175, 178, 181, 182, 188; 526/328, 333, 286, 263, 270, 302, 304

(56) References Cited

U.S. PATENT DOCUMENTS

| 4,167,464 | A | | 9/1979 | George |
| 4,248,685 | A | | 2/1981 | Beede et al. |
| 4,486,489 | A | | 12/1984 | George |
| 4,857,610 | A | | 8/1989 | Chmelir et al. |
| 5,059,664 | A | | 10/1991 | Yada et al. |
| 5,196,456 | A | * | 3/1993 | Nguyen et al. ............. 522/182 |
| 5,453,323 | A | | 9/1995 | Chambers et al. |
| 5,610,204 | A | | 3/1997 | Lai |
| 5,837,789 | A | | 11/1998 | Stockhausen et al. |
| 5,883,158 | A | | 3/1999 | Nambu et al. |
| 6,203,484 | B1 | * | 3/2001 | Lepore et al. ................ 422/28 |
| 6,297,335 | B1 | * | 10/2001 | Funk et al. ................. 526/240 |

OTHER PUBLICATIONS

Modern Superabsorbent Polymer Technology, edited by Fredric L. Buchholz and Andrew T. Graham, 1998.

* cited by examiner

Primary Examiner—Susan W. Berman
(74) Attorney, Agent, or Firm—Stewart A. Fraser; Robert W. Welsh

(57) ABSTRACT

One embodiment of the present invention is a method for synthesizing superabsorbent polyacrylate polymers comprising the steps of providing an acrylate monomer, a multifunctional monomer, and free radical initiator in the absence of a solvent; mixing the acrylate monomer, multifunctional monomer, and free radical initiator to create a solvent free solution; and subjecting the solvent free solution to radiation to create a cross-linked polymer. The product created by this method is also a part of the present invention.

42 Claims, No Drawings

SOLVENT-FREE METHOD FOR SYNTHESIZING SUPERABSORBENT POLYMERS

BACKGROUND OF THE INVENTION

Superabsorbent polymers are capable of absorbing many times their own weight in aqueous solutions. Therefore, there are many uses for polymers including use in infant diapers, adult incontinence products, feminine hygiene products, paper towels, surgical sponges, meat trays, disposable mats for outside doorways and bathrooms, household pet litter, bandages and wound dressings, controlled drug delivery, humidity-controlling products, soil conditioners, controlled release of fertilizers, thickening agents for cosmetics to concrete, sealing of underground cables, artificial snow, sensors, aqueous waste management, and gelling agents.

Due to their wide array of uses, large amounts of superabsorbent polymers are synthesized every year. It is estimated that 901,000 metric tons of superabsorbent polyacrylate polymers were produced in 1998.

A conventional method of manufacturing superabsorbent polyacrylate polymers has involved dissolving an acrylate monomer and a cross-linking monomer in a common solvent thereby forming a solution. The solution was then polymerized to form the cross-linked polymer. While this process is acceptable for superabsorbent polyacrylate polymers that can be formed from monomers with a common solvent, this process does not allow for the production of superabsorbent polyacrylate polymers made from monomers in which at least one of the monomers could not be adequately dissolved in a desired common solvent. The lack of adequate solubility of either monomer in the desired solvent has prevented the production of some superabsorbent polyacrylate polymers with desirable characteristics.

Thus, there is a need for a method of manufacturing superabsorbent polymers that will enable the use of monofunctional monomers and multifunctional monomers that lack a common solvent. Advantageously, by eliminating the solvent, the cost of the manufacturing process will be decreased and the environmental risk associated with the use of a solvent will be avoided. Furthermore, the wide range of articles that utilize superabsorbent polymers is indicative of the ever present need for a new process that will enable the production of superabsorbent polymers with unique properties that could be utilized in new applications or provide even better performing superabsorbent polymers in existing applications.

SUMMARY OF THE INVENTION

The present invention is a method for synthesizing superabsorbent polymers comprising the following steps. Providing a monofunctional monomer and a multifunctional monomer which are soluble in one another. Mixing the monofunctional monomer and multifunctional monomer in the absence of a solvent to form a solvent free solution. Exposing the solution to a source of energy that will initiate free radical polymerization thereby creating a cross-linked polymer. The product created by this method is also a part of the present invention.

These and other features, advantages and objects of the present invention will be further understood and appreciated by those skilled in the art by reference to the following specification and claims.

DEFINITIONS

Herein, the term "solvent" shall mean a substance, other than a monomer, which is capable of dissolving one or more monomers. The term solvent is defined to include a diluting agent.

A "solvent free" solution shall mean that no solvent, as the term "solvent" is defined above, is intentionally added to the subject solution.

A "monofunctional monomer" is defined as a monomer that contains only one unsaturated carbon to carbon bond that can participate in free radical polymerization. Acrylic acid is an example of a monofunctional monomer.

A "multifunctional monomer" is defined as a monomer that contains two or more unsaturated carbon to carbon bonds that can participate in free radical polymerization. Triethylene glycol divinyl ether is an example of a multifunctional monomer.

The term "soluble" is defined to mean the condition in which a first material is dissolved in a second material such that a solution is formed. As used herein, the first material is soluble in the second material if the first material readily dissolves in the second material without excessive use of heat, pressure or physical agitation.

The term "common solvent" is defined to mean a solvent, as the term solvent is defined above, in which both the monofunctional monomer and the multifunctional monomer are soluble.

A "superabsorbent polymer" is a cross-linked polymer that is capable of readily absorbing at least fifty percent of its own weight in water. Carpol™ C940, a commercially available cross-linked polyacrylate polymer, manufactured by B.F. Goodrich Company, is an example of a superabsorbent polymer.

DETAILED DESCRIPTION OF PREFERRED EMBODIMENT

In general, the present invention is a method of making superabsorbent polymers by mixing one or more monofunctional monomers with one or more multifunctional monomers in the absence of a solvent to form a solvent free solution which is then exposed to a source of energy that initiates a free radical polymerization process thereby resulting in the creation of a cross-linked polymer. To facilitate the polymerization process, a free radical initiator may be added to the solution of monomers prior to exposing the solution to the source of energy. The monofunctional monomers and the multifunctional monomers are selected so that they are soluble in one another. A typical source of energy that can be used to initiate the free radical polymerization is ultraviolet (UV) light. The molar ratio of monofunctional monomer to multifunctional monomer is from about 0.0001:100 to about 100:0.0001. Preferably, the combined weight of the monomers is at least 90% of the solution's total weight. More preferably, the combined weight of the monomers is at least 95% of the solution's total weight. Most preferably, the combined weight of the monomers is at least 99% of the solution's total weight. Typically, the solution is deoxygenated and then cast onto a substrate as a thin liquid film. The thickness of the film needs to be controlled so that the heat generated during the exothermic polymerization process is allowed to dissipate without harming the polymer. The use of a casting substrate that also functions as a heat sink is one way to accelerate the flow of heat away from the monomers during the polymerization process thereby allowing for the synthesis of a thicker polymer film than would be feasible if a heat sink was not used as the casting substrate. After casting, the film of solution is then exposed to UV light for a very short time, preferably less than ten seconds. The exposure to UV light may take place in a low oxygen environment. A cross-linked network forms as a solid film that will readily absorb aqueous solutions. The film that forms can be left intact or ground for use as a powder. The absorption capability of the polymer thus formed depends on the chemistry of the monomers used and the molar ratios of monofunctional monomer to multifunctional monomer. Furthermore, the process can be adjusted by varying the amount of initiator, the intensity and/or length of time the solution is exposed to the source of energy and/or the amount of oxygen in the solution.

Many different monofunctional monomers and multifunctional monomers can be used to customize properties of the superabsorbent polymer. In particular, the method of the present invention allows the use of monofunctional monomers and multifunctional monomers that are soluble in one another but are not both adequately soluble in a common solvent which is capable of sustaining free radical polymerization. Hence, the method of the present invention allows the combinations of monofunctional monomers and multifunctional monomers previously considered not feasible due to the lack of an acceptable common solvent. Examples of monofunctional monomers that can be used with the present invention include acrylate monomers, methacrylate monomers and vinyl monomers. Examples of acrylate monomers include acrylic acid, 2-hydroxyethyl acrylate, acrylamide, 2-(2-ethoxyethoxy)ethyl acrylate and glycerol monoacrylate. Methacrylate monomers suitable for use in this invention include methacrylic acid, 2-hydroxyethylmethacrylate, 2-ethoxyethyl methacrylate, and glycerol monomethacrylate. Vinyl monomers suitable for use in this invention include vinyl acetate, vinyl sulfonic acid, vinyl methyl sulfone, vinyl methylacetamide, vinyl butyrate, vinyl propionate, vinyl urea, 2-vinyl pyridine, 4-vinyl pryidine and vinyl-2-pyrrolidone. Examples of multifunctional monomers that can be used with the present invention include pentaerythritol triallyl ether, diethylene glycol divinyl ether, triethylene glycol divinyl ether, 1,1,1-trimethylolpropane diallyl ether, allyl sucrose, divinyl benzene, dipentaerythritol pentaacrylate, N,N'-methylenebisacrylamide, triallylamine, triallyl citrate, ethylene glycol diacrylate, diethylene glycol diacrylate, di-ethylene glycol dimethacrylate, tetraethylene glycol diacrylate, trimethylol propane trimethacrylate, ethylene glycol dimethacrylate, tetraethylene glycol dimethacrylate, trimethylol propane trimethacrylate, dipropylene glycol dimethacrylate, ditrymethylol propane tetracrylate, pentaerythritol tetraacrylate, pentaerythritol triacrylate, and vinyl acrylate. Furthermore, a variety of free radical initiators, such as photo-sensitive initiators, can be used. Examples of such photo-sensitive initiators include benzophenone, Irgacure® 184 from Ciba Specialty Chemicals Corp. of Tarrytown, N.Y., and Irgacure® 500 from Ciba Specialty Chemicals.

The present invention can be used to create superabsorbent polymeric films as well as powders, and alternate initiation methods could conceivably be employed, such as the use of an electron beam, x-ray, gamma ray, or thermal initiation. It is contemplated that there are a vast array of potential uses for the superabsorbent film or powder created by the method of the present invention. For example, transdermal patches could be produced by incorporating biologically active ingredients into the solvent free monomer solution described above.

The present invention provides, for the first time, a method for synthesizing a superabsorbent polymer from a monofunctional monomer and a multifunctional monomer that are soluble in one another but do not have a common solvent which is capable of sustaining free radical polymerization. The present invention eliminates the need for an undesirable solvent as well as the need for a drying step which is typically used when producing superabsorbent polymers. In addition, superabsorbent polymers with physical characteristics not attainable with previously known manufacturing processes are now made possible. The following example illustrates a method for carrying out the present invention.

EXAMPLE

Several superabsorbant films of this invention were manufactured by mixing acrylic acid with different multifunctional monomers and photoinitiators. In one example, an acrylic acid monomer, 0.1 mole percent triethylene glycol divinyl ether, and Irgacure® 184 from Ciba Specialty Chemicals were mixed to form a solution. No solvent was added to the solution of monomers and photosensitive initiator. In an inert environment, the liquid solution was deoxygenated and then poured into a large petri dish. The solution was polymerized by passing it under UV lamps thereby creating a film specimen. The time of exposure to the UV lamps was ten seconds. The specimen was ground in a mill and then by a mortar and pestle grinding. The larger particles were separated. The remaining powder was stirred with a magnetic stirrer. When water was added to the powder a highly viscous gel was formed. The clear gel had physical and visual properties very similar to that of commercially available superabsorbent polyacrylate polymers.

The above description is considered that of an example only. Modifications of the invention will occur to those skilled in the art and to those who make or use the invention. For example, the time that the monomer solution is exposed to ultraviolet light can be varied to accommodate changes in the monofunctional monomer, multifunctional monomer, concentration of oxygen or amount of initiator. Therefore, it is understood that the embodiment shown above is merely for illustrative purposes and is not intended to limit the scope of the invention, which is defined by the following claims as interpreted according to the principles of patent law, including the doctrine of equivalents.

The invention claimed is:

1. A method for synthesizing a superabsorbent polymer comprising the steps of:
   a. providing a monofunctional monomer;
   b. providing a multifunctional monomer, wherein said monofunctional-monomer and said multifunctional monomer are soluble in one another;
   c. mixing said monofunctional monomer and said multifunctional monomer in the absence of a solvent to form a solvent free solution; and
   d. exposing said solvent free solution to a source of energy that will cause the monomers to polymerize.

2. The method defined in claim 1 wherein two or more monofunctional monomers are provided.

3. The method defined in claim 1 wherein two or more multifunctional monomers are provided.

4. The method defined in claim 1 wherein the combined weight of the monomers is at least 90% of the solution's total weight.

5. The method defined in claim 1 wherein the combined weight of the monomers is at least 95% of the solution's total weight.

6. The method defined in claim 1 wherein the combined weight of the monomers is at least 99% of the solution's total weight.

7. The method defined in claim 1 wherein the monofunctional monomer is selected from the group consisting of acrylate monomers, methacrylate monomers and vinyl monomers.

8. The method defined in claim 7 wherein the acrylate monomer is selected from the group consisting of acrylic acid, 2-hydroxyethyl acrylate, acrylamide, 2-(2-ethoxyethoxy)ethyl acrylate and glycerol monoacrylate.

9. The method defined in claim 7 wherein the methacrylate monomer is selected from the group consisting of methacrylic acid, 2-hydroxyethylmethacrylate, 2-ethoxyethyl methacrylate, and glycerol monomethacrylate.

10. The method defined in claim 7 wherein the vinyl monomer is selected from the group consisting of vinyl acetate, vinyl sulfonic acid, vinyl methyl sulfone, vinyl methylacetamide, vinyl butyrate, vinyl propionate, vinyl urea, 2-vinyl pyridine, 4-vinyl pryidine and vinyl-2-pyrrolidone.

11. The method defined in claim 1 wherein the multifunctional monomer is selected from the group consisting of pentaerythritol triallyl ether, diethylene glycol divinyl ether, triethylene glycol divinyl ether, 1,1,1-trimethylolpropane diallyl ether, allyl sucrose, divinyl benzene, dipentaerythritol pentaacrylate, N,N'-methylenebisacrylamide, triallylamine, triallyl citrate, ethylene glycol diacrylate, di-ethylene glycol diacrylate, di-ethylene glycol dimethacrylate, tetraethylene glycol diacrylate, trimethylol propane trimethacrylate, ethylene glycol dimethacrylate, tetraethylene glycol dimethacrylate, trimethylol propane trimethacrylate, dipropylene glycol dimethacrylate, di-trymethylol propane tetracrylate, pentaerythritol tetraacrylate, pentaerythritol triacrylate, and vinyl acrylate.

12. The method defined in claim 1 wherein said solution of monomers is exposed to said source of energy in an oxygen free environment.

13. The method defined in claim 1 wherein the source of energy is selected from the group consisting of ultraviolet light, electron beam, x-ray and gamma ray.

14. The polymer produced according to the method of claim 1.

15. A method for synthesizing a superabsorbent polymer consisting essentially of the following steps:
a. providing a monofunctional monomer;
b. providing a multifunctional monomer;
c. providing a free radical initiator, wherein said initiator will form free radicals upon activation;
d. mixing said monofunctional monomer, said multifunctional monomer and said free radical initiator to form a solution; and
e. exposing said solution to a source of energy that will activate said free radical initiator and cause said monomers to polymerize.

16. The method defined in claim 15 wherein the monofunctional monomer is selected from the group consisting of acrylate monomers, methacrylate monomers and vinyl monomers.

17. The method defined in claim 16 wherein the acrylate monomer is selected from the group consisting of acrylic acid, 2-hydroxyethyl acrylate, acrylamide, 2-(2-ethoxyethoxy)ethyl acrylate and glycerol monoacrylate.

18. The method defined in claim 16 wherein the methacrylate monomer is selected from the group consisting of methacrylic acid, 2-hydroxyethylmethacrylate, 2-ethoxyethyl methacrylate, and glycerol monomethacrylate.

19. The method defined in claim 16 wherein the vinyl monomer is selected from the group consisting of vinyl acetate, vinyl sulfonic acid, vinyl methyl sulfone, vinyl methylacetamide, vinyl butyrate, vinyl propionate, vinyl urea, 2-vinyl pyridine, 4-vinyl pryidine and vinyl-2-pyrrolidone.

20. The method defined in claim 15 wherein the multifunctional monomer is selected from the group consisting of pentaerythritol triallyl ether, diethylene glycol divinyl ether, triethylene glycol divinyl ether, 1,1,1-trimethylolpropane diallyl ether, allyl sucrose, divinyl benzene, dipentaerythritol pentaacrylate, N,N'-methylenebisacrylamide, triallylamine, triallyl citrate, ethylene glycol diacrylate, di-ethylene glycol diacrylate, di-ethylene glycol dimethacrylate, tetraethylene glycol diacrylate, trimethylol propane trimethacrylate, ethylene glycol dimethacrylate, tetraethylene glycol dimethacrylate, trimethylol propane trimethacrylate, dipropylene glycol dimethacrylate, di-trymethylol propane tetracrylate, pentaerythritol tetraacrylate, pentaerythritol triacrylate, and vinyl acrylate.

21. The method defined in claim 15 wherein two or more monofunctional monomers are provided.

22. The method defined in claim 15 wherein two or more multifunctional monomers are provided.

23. The method defined in claim 15 wherein the free radical initiator is photosensitive.

24. The method defined in claim 23 wherein the photosensitive initiator is benzophenone.

25. The method defined in claim 15 wherein the free radical initiator is thermally activated.

26. The method defined in claim 15 wherein said solution of monomers and free radical initiator is exposed to the source of energy in an oxygen free environment.

27. The method defined in claim 15 wherein the source of energy is selected from the group consisting of ultraviolet light, electron beam, x-ray and gamma ray.

28. The polymer produced according to the method of claim 15.

29. A method for synthesizing a polymer consisting of the following steps:
a. providing a monofunctional monomer;
b. providing a multifunctional monomer;
c. providing a free radical initiator, wherein said initiator will form free radicals upon activation;
d. mixing said monofunctional monomer, said multifunctional monomer and said free radical initiator to form a solution; and
e. exposing said solution to a source of energy that will activate said free radical initiator and cause said monomers to polymerize.

30. The method defined in claim 29 wherein the monofunctional monomer is selected from the group consisting of acrylate monomers, methacrylate monomers and vinyl monomers.

31. The method defined in claim 30 wherein the acrylate monomer is selected from the group consisting of acrylic acid, 2-hydroxyethyl acrylate, acrylamide, 2-(2-ethoxyethoxy)ethyl acrylate and glycerol monoacrylate.

32. The method defined in claim 30 wherein the methacrylate monomer is selected from the group consisting of methacrylic acid, 2-hydroxyethylmethacrylate, 2-ethoxyethyl methacrylate, and glycerol monomethacrylate.

33. The method defined in claim 30 wherein the vinyl monomer is selected from the group consisting of vinyl acetate, vinyl sulfonic acid, vinyl methyl sulfone, vinyl methylacetamide, vinyl butyrate, vinyl propionate, vinyl urea, 2-vinyl pyridine, 4-vinyl pryidine and vinyl-2-pyrrolidone.

34. The method defined in claim 29 wherein the multifunctional monomer is selected from the group consisting of pentaerythritol triallyl ether, diethylene glycol divinyl ether, triethylene glycol divinyl ether, 1,1,1-trimethylolpropane diallyl ether, allyl sucrose, divinyl benzene, dipentaerythritol pentaacrylate, N,N'-methylenebisacrylamide, triallylamine, triallyl citrate, ethylene glycol diacrylate, di-ethylene glycol diacrylate, di-ethylene glycol dimethacrylate, tetraethylene glycol diacrylate, trimethylol propane trimethacrylate, ethylene glycol dimethacrylate, tetraethylene glycol dimethacrylate, trimethylol propane trimethacrylate, dipropylene glycol dimethacrylate, di-trymethylol propane tetracrylate, pentaerythritol tetraacrylate, pentaerythritol triacrylate, and vinyl acrylate.

35. The method defined in claim 29 wherein two or more monofunctional monomers are provided.

36. The method defined in claim 29 wherein two or more multifunctional monomers are provided.

37. The method defined in claim 29 wherein the free radical initiator is photosensitive.

38. The method defined in claim 37 wherein the photosensitive initiator is benzophenone.

39. The method defined in claim 29 wherein the free radical initiator is thermally activated.

40. The method defined in claim 29 wherein said solution of monomers and free radical initiator is exposed to a source of energy in an oxygen free environment.

41. The method defined in claim 29 wherein the source of energy is selected from the group consisting of ultraviolet light, electron beam, x-ray and gamma ray.

42. The polymer produced according to the method of claim 29.

\* \* \* \* \*